(No Model.)

R. S. PEABODY.
MANDREL.

No. 533,827. Patented Feb. 5, 1895.

WITNESSES:
W. Hermann Apgar.
K. M. Gilligan.

INVENTOR
Robert Singleton Peabody
BY Augustus B. S. Houghton.
ATTORNEY

UNITED STATES PATENT OFFICE.

ROBERT SINGLETON PEABODY, OF PHILADELPHIA, PENNSYLVANIA.

MANDREL.

SPECIFICATION forming part of Letters Patent No. 533,827, dated February 5, 1895.

Application filed May 11, 1894. Serial No. 510,848. (No model.)

*To all whom it may concern:*

Be it known that I, ROBERT SINGLETON PEABODY, a citizen of the United States, residing at the city of Philadelphia, in the county of Philadelphia and State of Pennsylvania, have invented certain new and useful Improvements in Mandrels, of which the following is a specification.

The principal object of my present invention is to provide a simple, comparatively inexpensive, and durable mandrel for centering and holding objects, such as wheels, having openings of different caliber or bore; and to this end my invention consists of the improvements hereinafter fully described and pointed out in the claim.

The nature, characteristic features, and scope of my present invention will be more fully understood from the following description taken in connection with the accompanying drawings forming part hereof, and in which—

Figure 1:
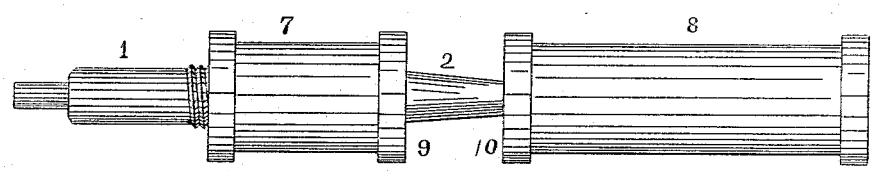
Figure 2:
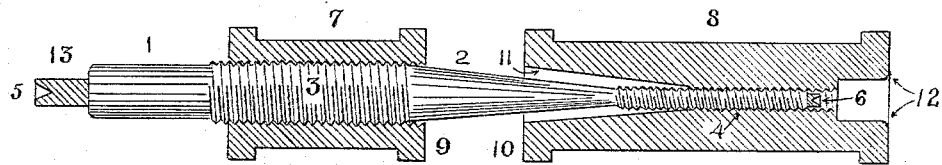

Figure 1, is a side elevational view of a mandrel embodying features of my invention, and Fig. 2, is a transverse central section of the same.

In the drawings, 1, is a spindle having its intermediate portion tapered as at 2, and having its larger and smaller end portions cylindrical in form and externally threaded as at 3 and 4. The respective ends of the spindle 1, are counter sunk, as at 5 and 6, for purposes to be hereinafter described.

7 and 8, are internally tapped sleeves adapted to the correspondingly threaded portions 3, and 4, of the spindle 1, and having parallel faces 9 and 10, for purposes hereinafter set forth. One end of the sleeve 8, is hollowed out as at 11, for the accommodation of the tapered portion 2, of the spindle 1, and the other end thereof is properly counter-sunk as at 12, for purposes to be hereinafter explained.

The mode of operation of the hereinabove described mandrel is as follows: The sleeve 7, is screwed back toward the left and the sleeve 8, is detached from the spindle 1. The small end of the spindle 1, is then passed through the opening in the object which is to be mounted upon the mandrel. For the sake of a description, it will be assumed that the object to be mounted on the mandrel is a wheel. The wheel or other object is then shifted onto the tapering portion 2, of the spindle 1, whereby it is accurately centered. The sleeve 8, is then replaced upon the spindle and the sleeves 7 and 8 are then screwed toward each other until their flat parallel ends 9 and 10, grasp or clamp the wheel or other object. The spindle 1, may then be mounted in a lathe with its countersunk portion 5, supported by the headstock center and with either of its countersunk portions 6 or 12, supported by the tailstock center and rotated through the intervention of a dog or chuck which may be conveniently applied to the shoulder 13. In this connection it may be remarked that the flat surfaces 9 and 10, support the work upon opposite sides, thus holding the same firmly and relieving the tapered portion 2, from accidental abrasion.

From the foregoing description it appears that if the wheel or other work should under the influence of tools or for any other reason tend to turn in respect to the mandrel when the latter is mounted and rotated, for example, in a lathe, the wheel or other work will, by reason of the friction existing between it and the flat faces 9 and 10, tend to screw and turn and fasten the sleeves 7 and 8, upon the threaded portion of the spindle, so that the sleeves will operate after the manner of jam-nuts and thus oppose and prevent any tendency to undesirable movement of the wheel in respect to the mandrel and to the sleeves.

It will be obvious to those skilled in the art to which my invention appertains that modifications may be made in details, without departing from the spirit thereof. Hence I do not limit myself to the precise construction and arrangement of parts herein set forth and shown; but,

Having thus described the nature and objects of my present invention, what I claim as new, and desire to secure by Letters Patent, is—

A mandrel for centering and clamping objects comprising a spindle having its intermediate portion of the form of a conic frustum and having its ends cylindrical and of the diameter of the respective bases of the frustum and provided with threads of the same direction extending to said bases, and sleeves tapped and screwed onto the respective ends of the spindle and provided respectively with flat parallel faces for contacting with the work, whereby any accidental movement of the work binds the sleeves upon the spindle near the bases of the frustum and upon the work, substantially as described.

In testimony whereof I have hereunto signed my name in the presence of two witnesses.

ROBERT SINGLETON PEABODY.

Witnesses:
ANDREW B. CAMPBELL,
A. B. STOUGHTON.